United States Patent

Endo

[19]

[11] Patent Number: 6,020,965
[45] Date of Patent: Feb. 1, 2000

[54] PHASE INTERFERENCE MICROSCOPE

[75] Inventor: Tomio Endo, Hidaka, Japan

[73] Assignee: Olympus Optical Co., Ltd., Tokyo, Japan

[21] Appl. No.: 09/035,609

[22] Filed: Mar. 5, 1998

[30] Foreign Application Priority Data

Mar. 11, 1997 [JP] Japan .................................. 9-056325

[51] Int. Cl.[7] .................................................. G01B 9/02
[52] U.S. Cl. ........................... 356/360; 356/357; 356/359
[58] Field of Search .................................... 356/357, 359, 356/360

[56] References Cited

U.S. PATENT DOCUMENTS

| | | | |
|---|---|---|---|
| 5,112,129 | 5/1992 | Davidson et al. | 356/359 |
| 5,402,234 | 3/1995 | Deck | 356/357 |
| 5,471,303 | 11/1995 | Ai et al. | 356/357 |
| 5,602,643 | 2/1997 | Barrett | 356/360 |
| 5,706,085 | 1/1998 | Blossey et al. | 356/357 |

OTHER PUBLICATIONS

Article entitled "Electromagnetic Theory of Propagation, Interference and Diffraction of Light", By Max Born, et al, Published by Pergamon Press Ltd., Oxford England and distributed by The Macmillan Company, New York, New York, 1964, title page, copyright notice page, pp. 444–449.

Article entitled "Computerized Phase Microscope for Investigation of Submicron Structures", By V.P. Tychinsky et al, Published in Optics Communications, vol. 74, No. 1, 2, pp. 37–40, Dec. 1, 1989.

*Primary Examiner*—Robert H. Kim
*Assistant Examiner*—Andrew H. Lee
*Attorney, Agent, or Firm*—Frishauf, Holtz, Goodman, Langer & Chick, P.C.

[57] ABSTRACT

A phase interference microscope, comprising a light source for emitting coherent light with a constant wavelength, an interference optical system for splitting the light emitted from the light source into two light beams, irradiating one of the split light beams onto a sample and the other split light beam onto a reference mirror, and making the light beam reflected from the sample interfere with the light beam reflected from the reference mirror, a focusing device for recognizing a position of a middle point in a phase anomaly of interference light generated in the vicinity of a focusing point as a focusing point for the sample, and moving the sample to the focusing position, and a size measurement device for measuring a size of the sample on the basis of the interference light.

8 Claims, 3 Drawing Sheets

PHASE INTERFERENCE MICROSCOPE

BACKGROUND OF THE INVENTION

The present invention relates to a phase interference microscope for forming images of bumps on a surface of a sample by employing interference of light, and particularly, to a phase interference microscope whose focusing method to the sample surface is improved.

As a microscope which allows bumps on a sample surface to be observed at high accuracy, a phase interference microscope (V. R. Tychinsky, I. N. Masalov, V. L. Pankov and D. V. Ublinsky: OPTICS Comm., Vol.74, (1989), pp.37–40.) has been well known.

In this phase microscope, laser light is irradiated on a surface of a sample having bumps, and the bumps on the sample surface are measured at high resolving power on the basis of the phase difference between light beams reflected from recessed portions and protruding portions of the sample surface.

That is, the resolving power D of the bumps of the sample can be represented by $$D = m\lambda/(4\pi) \qquad (1)$$

where $\lambda$ represents a wavelength of the irradiated laser light and $\pi$ represents a phase resolving power.

It can be understood that if the wavelength $\lambda$ is 630 nm and the phase resolving power m is 5 degrees (0.087 rad), the resolving power D of the bumps is about 4 nm, i.e. very high.

Incidentally, when the sample bumps are measured at the high resolving power, a focal point needs to be exactly applied to the sample. If it is not, reflection signals from points other than the measured points are included and the bumps cannot be exactly measured. Particularly, when an XY bearing resolution is raised by employing the phase and polarization, a desirable directional resolving power cannot be obtained unless focusing cannot be exactly operated.

However, there has been a problem that even if the focal point is applied visibly or a passive or active automatic focusing method, focusing can be executed at accuracy of only about ±$\lambda$.

BRIEF SUMMARY OF THE INVENTION

Therefore, the object of the present invention is to provide a phase interference microscope which allows focusing to be executed at high accuracy and allows a high resolving power which is inherent in a phase interference microscope to be utilized at maximum.

The present invention is a phase interference microscope, comprising:

a light source for emitting coherent light with a constant wavelength;

an interference optical system for splitting the light emitted from the light source into two light beams, irradiating one of the split light beams onto a sample and the other split light beam onto a reference mirror, and making the light beam reflected from the sample interfere with the light beam reflected from the reference mirror;

a focusing device for recognizing a position of a middle point in a phase anomaly of interference light generated in the vicinity of a focusing point as a focusing point for the sample, and moving the sample to the focusing position; and a size measurement device for measuring a size of the sample on the basis of the interference light.

According to this structure, since the focusing position is obtained on the basis of the phase anomaly, focusing accuracy can be enhanced to the level of accuracy in phase measurement. When the phase anomaly ranges from 0 to 180 degrees, if the accuracy in phase measurement (phase resolving power) is 5 degrees, focusing can be executed at accuracy of $\lambda/36$ (1/36 wavelength). The accuracy in focusing according to a conventional contrast method is approximately $\lambda$, and therefore, the accuracy in focusing can be enhanced by one digit or higher.

As a result, according to the phase interference microscope of the present invention, since focusing can be executed at higher accuracy, the high resolving power of the phase interference microscope can be effectively utilized.

Further, it is preferable to execute rough focusing before executing the focusing which utilizes the phase anomaly. In this case, what is called a contrast method may be utilized as a focusing method. According to this contrast method, focusing can be executed at accuracy of ±$\lambda$, and the phase anomaly can be detected by moving the sample in a range of, for example, ±2$\lambda$ around this focusing position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be explained with reference to the figures.

(Structure)

Figure 1:
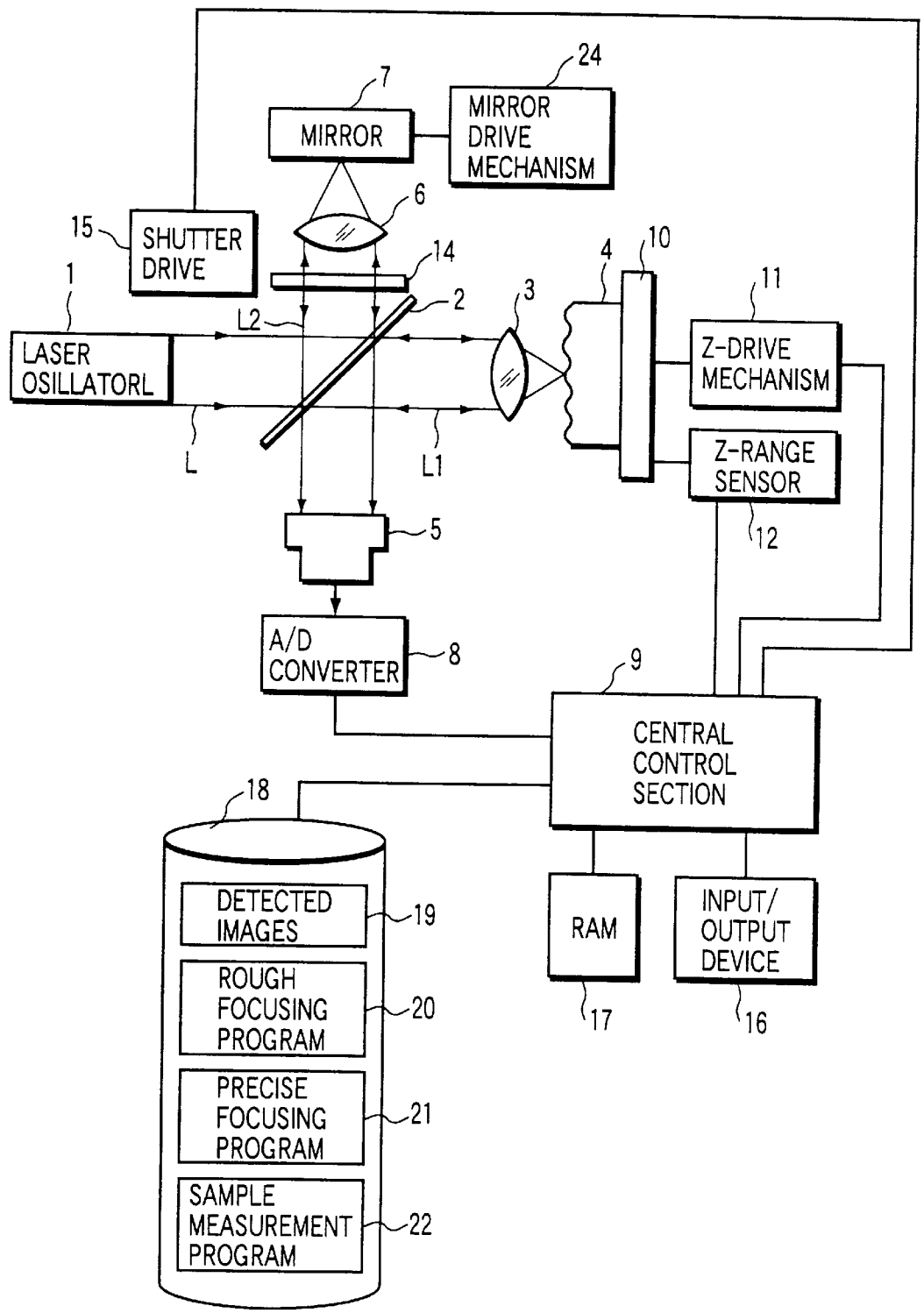
FIG. 1 is a schematic view explaining an embodiment of the present invention.

FIG. 1 schematically shows a structure of the embodiment of the present invention.

In FIG. 1, reference numeral 1 denotes a laser oscillator for generating a plane wave of a constant coherent wavelength. Laser light L generated at the laser oscillator 1 is split into transmitted light L1 and reflected light L2 by a half mirror 2. The transmitted light L1, of the two split light beams, is made incident on a surface of a sample 4 by a first lens 3, and the reflected light L2 is made incident on a reference mirror 7 having a reflection surface by a second lens 6.

Both the light beams reflected at the sample 4 and the reference mirror 7 are detected by a photo-detector (CCD, etc.) denoted by reference numeral 5 in FIG. 1. Therefore, the reflected light beam from the sample 4 and that from the reference mirror 7 interfere at this photo-detector 5. In this case, since the light beam of a constant phase is reflected from the reference mirror 7, variation of an intensity of the interference light detected by the photo-detector 4 represents bumps on the surface of the sample 3. An A/D converter 8 for converting an output of the photo-detector 5 to a digital signal is connected to the photo-detector 5, and the A/D converter 8 is connected to a central control section 9.

In addition, the sample 4 is held on a sample holding table 10. A Z-drive mechanism 11 for driving the sample 4 in a Z-direction (in an optical axis) and a Z-range sensor 12 for measuring an amount of drive of the Z-drive mechanism 11 (i.e. an amount of movement of the sample 4) are connected to the table 10. The Z-dive mechanism 11 and the Z-range sensor 12 may be constituted by piezoelectric elements, which are controlled by the central control section 9.

Further, the phase interference microscope of this embodiment comprises a shutter denoted by reference numeral 14 in FIG. 1. The shutter 14 prohibits the light made incident on the reference mirror 7. The shutter 14 is operated by an instruction from the central control section 9 via a shutter driver 15.

An input/output device 16, a RAM 17, and a memory device 18 such as a hard disc, etc. for storing a main program and detected images, are connected to the central control section 9. The memory device 18 stores images detected by the photo-detector 5, a rough focusing program 20 for executing rough focusing on the sample, a precise focusing program 21 for executing precise focusing on the sample, and a measurement process program 22 for obtaining a height of the bumps on the surface of the sample 4 from the difference in interference phase between the reflected light beams.

Next, operations of the phase interference microscope will be explained in detail.

(Rough focusing)

In this embodiment, rough focusing is first executed, and the focusing is executed on the sample 4 with accuracy of approximately ±λ.

In this case, the central control section 9 closes the shutter 14 via the shutter driver 15, on the basis of the rough focusing program 20 stored in the memory device 18. The light incident on the reference mirror 7 is thereby prohibited by the photo-detector 5.

Then, when the laser oscillator 1 is operated, the photo-detector 5 detects the reflection intensity images of the sample 4 as a general optical microscope does since the reflected light from the sample 4 does not interfere with the reflected signal from the reference mirror 7.

Next, the central control section 9 executes the rough focusing, with reference to the reflection intensity images of the sample 4. That is, the central control section 9 operates the Z-drive mechanism 11 while monitoring a contrast of the reflection intensity images, and stops the table 10 at a position where the contrast becomes maximum. According to the focusing manner, in this state, the focal point is applied to the surface of the sample 4 at accuracy of approximately ±λ. This accuracy is substantially the same as the accuracy in focusing in a conventional phase interference microscope.

(Precise focusing)

After the rough focusing has been finished, precise focusing is executed on the basis of the precise focusing program 21.

First, the central control section 9 closes the shutter 14, so that the interference light of the reflected light beams from the reference mirror 7 and the sample 4 can be detected by the photo-detector 5.

Then, moving the sample 4 in a range of approximately ±λ of the rough focusing position by operating the Z-drive mechanism 11, the central control section 9 allows the photo-detector 5 to detect the intensity characteristic of the interference light varied in accordance with the movement of the sample 4.

On the basis of this, the central control section 9 obtains the relationship between the variation of the intensity characteristic of the interference light and an amount of the varied phase detected by the Z-range sensor 12. If the sample 4 is moved in the Z direction, the phase variation based on the amount of variation of the optical path length represented by equation (2) is obtained as well as the phase variation resulting from the focusing.

$$4\pi Z/\lambda \quad (2)$$

Figure 3:
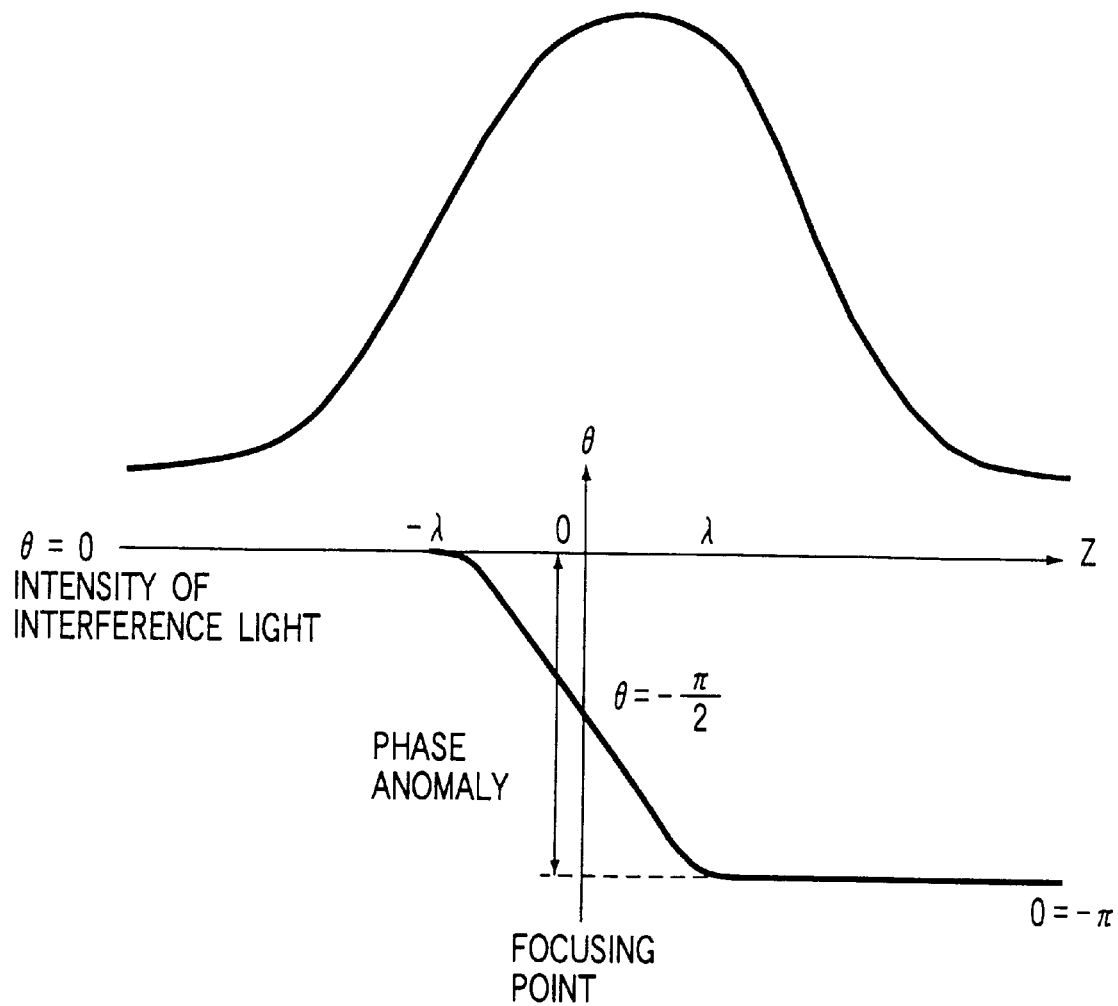
FIG. 3 is a view explaining an amount of abnormal phase generated in the vicinity of a focusing point.

Therefore, by removing the phase variation of equation (2) from the results of measurement of the phase, the results of measurement represented in a graph, i.e. FIG. 3, can be obtained.

As shown in FIG. 3, the phase of the interference light is varied by the amount $\pi$ in the vicinity of the focusing position. Such the inversion of the phase of interference light by the amount $\pi$ in the vicinity of the focal point is based on the optical characteristic of the lens. That is, when the light beam converged by the lens, other than that corresponding to an optical axis, passes along an optional light beam in the vicinity of the focal point, its phase is varied by the amount $\pi$ rapidly but continuously (M. Born and E. Wolf: "Principles of Optics" published by the publication section of Tokai University (1975), pp.664–669). The amount of phase variation in the vicinity of the focus is generally called 'phase anomaly'.

The present invention carries out the precise focusing operation by taking advantage of such a phase anomaly.

That is, the central control section 9 obtains a middle point $\frac{1}{2}\pi$ of the phase anomaly $\pi$ on the basis of the results of measurement represented in FIG. 3, and moves the sample 4 to the middle position by employing a Z-drive mechanism 11. It is assumed that the accuracy in measurement of the phase is 5 degrees.

In a general lens, since the phase is varied from 0 to 180 degrees in a range of two wavelengths before and after the focus, the focusing is possible with accuracy of $\lambda/36$. Therefore, the focus can be detected with accuracy higher by at least one digit than that for the rough focusing.

Figure 2:
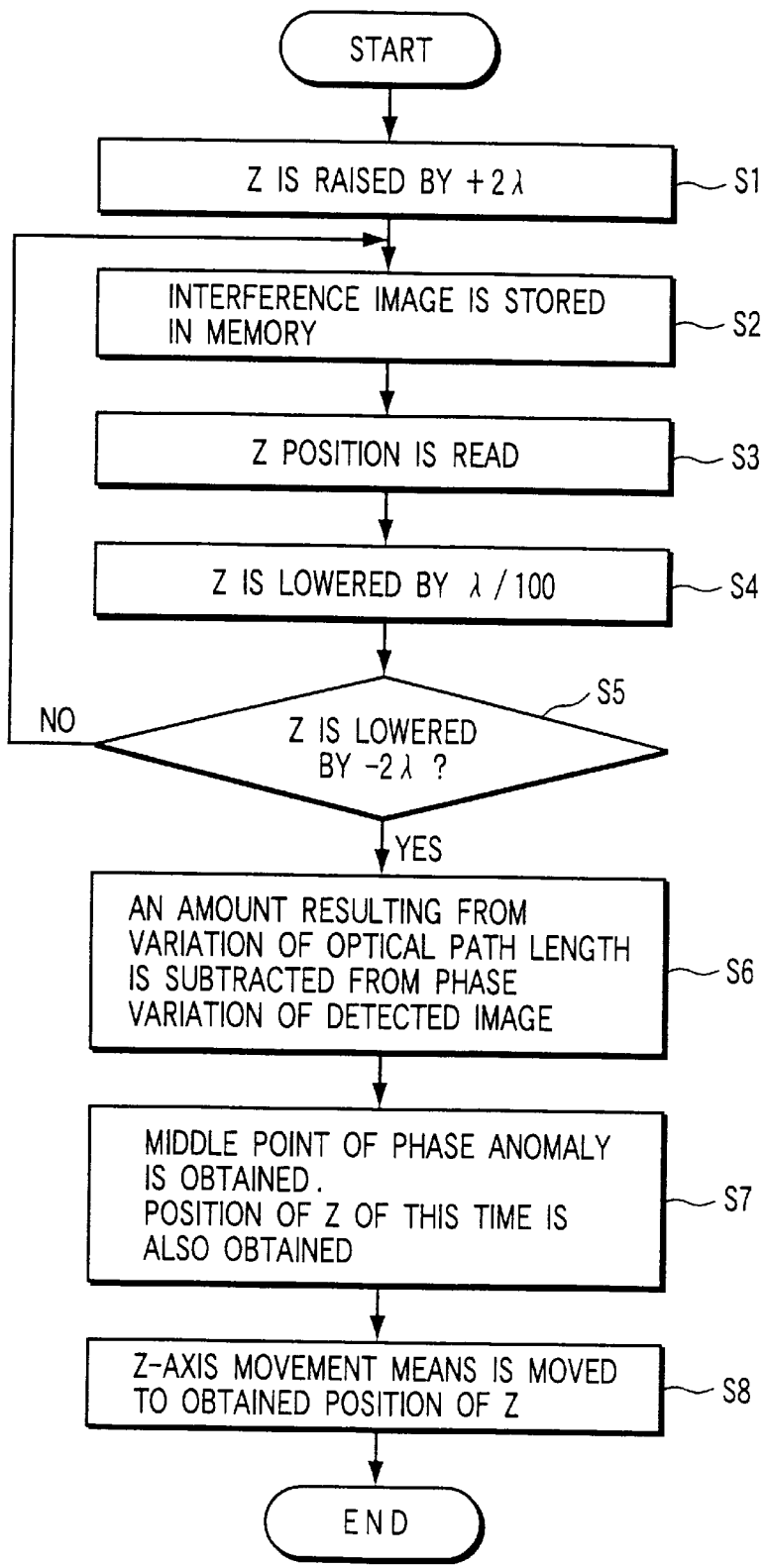
FIG. 2 is a flow chart explaining a precise focusing operation.

FIG. 2 is a flow chart of the precise focusing operation to explain the above-described process of the focus detecting means.

First, the sample 4 is moved by the length of about $+2\lambda$ by the Z-drive mechanism 11 (S1). At this time, an interference image obtained by the photo-detector 5 is stored in the memory device 18 (S2). The length of movement of the sample 4 is detected by the Z-range sensor 17 (S3). On the basis of this, the sample 4 is moved by every $\lambda/100$ in the negative direction (S4). This operation is repeated until the amount of movement of the sample 4 is $-2\lambda$ (S5). After that, an amount resulting from the variation of the optical path length is subtracted from the phase variation of the detected image (S6). The characteristic of phase variation represented in FIG. 3 can be obtained from the above process.

Next, the central control section 9 determines the Z position (focusing position) of the sample 4 which becomes the middle point $\frac{1}{2}\pi$ of the phase anomaly in a range from 0 to $\pi$ (S7). The central control section 9 moves the Z-drive mechanism 11 by the value Z obtained at step S7 the moves the sample 4 to the focusing position (S8).

(Measurement of the Sample Surface)

After the above-described precise focusing steps have been finished, the central control section 9 measures the bumps on the sample surface on the basis of the sample measurement program 22.

That is, first, the interference light of the reflected light beams from the sample 4 and the reference mirror 7 is detected by the photo-detector 5. In this case, since the light of a constant phase is reflected from the reference mirror 7, the intensity variation of the interference light detected by the photo-detector 5 represents the bumps on the surface of the sample 4.

The detection signal from the photo-detector 5 is input to the central control section 9 via the A/D converter 8, and the central control section 9 calculates the bumps on the sample surface in accordance with this detection signal.

The present invention is not limited to the above-described embodiment. For example, the present invention can be modified in a following manner.

First, the shutter 14 is provided in the embodiment, and the reflected light from the reference mirror 7 is prohibited by employing the shutter 14, and the rough focusing is executed by taking advantage of the only contrast of the reflected light from the sample 4.

However, as the rough focusing, the other methods may be employed. For example, the shutter 14 may not be provided and the reference mirror 7 may be swung back and forth by the mirror drive mechanism denoted by reference numeral 24 in FIG. 1 to detect the interference light and thereby obtain the contrast of the sample surface. That is, every time the sample is moved in a predetermined amount by the Z-drive mechanism 11, the mirror 7 is swung back and forth at one time in an amount equivalent to $\lambda/8$.

Then, the intensity signals detected before and after the movement of the sample are raised to the second power, added to each other, and processed in a square root. Terms of $\sin \theta$ and $\cos \theta$ are thereby deleted, and the only light intensity distribution of the reflected light from the sample 4 can be extracted. Therefore, the position where the contrast becomes maximum may be determined as the rough focusing position in accordance with the light intensity distribution thus detected.

In addition, the rough focusing may not be limited to the contrast method, and the other methods may be employed. The important matter is to execute the focusing of the sample to prepare for the precise focusing steps in accordance with the phase variation.

Further, in the precise focusing, the phase variation caused by the movement of Z shown in FIG. 3 mat be differentiated and the center of the position t which the differentiated value is varied may be detected as the focusing position. The phase variation shown in FIG. 3 is obtained by subtraction of the movement of Z made by the Z-range means and, therefore, the Z-range means 17 is needed even if differentiation is employed.

Moreover, needless to say, the present invention can be variously modified in a range which cannot change the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A phase interference microscope, comprising:

a light source for emitting coherent light with a constant wavelength;

an interference optical system for splitting the light emitted from said light source into first and second light beams, irradiating the first light beam onto a sample and the second light beam onto a reference mirror, the first light beam reflecting off the sample and the second light beam reflecting off the reference mirror, and making the first light beam reflected off said sample interfere with the second light beam reflected off said reference mirror;

a focusing device for recognizing a position of a middle point in a phase anomaly of interference light generated in the vicinity of a focusing point as a focusing point for said sample, and moving said sample to said focusing position; and a size measurement device for measuring a size of said sample on the basis of said interference light.

2. A phase interference microscope according to claim 1, wherein said focusing device, while moving said sample, obtains the phase anomaly in the vicinity of said focusing position by obtaining phase variation of said interference light.

3. A phase interference microscope according to claim 1, wherein said focusing device, while moving said sample, obtains a point at which a phase of said interference light is rapidly varied and then obtains a middle point of said variation point as a middle point of the phase anomaly.

4. A phase interference microscope according to claim 1, wherein said focusing device moves said sample by an amount corresponding to a phase resolving power, and measures an amount of phase variation while measuring a position of said sample; and obtains the position of said sample which is a middle point of the phase anomaly as a focusing position on the basis of results of measurement of the sample position.

5. A phase interference microscope according to claim 1, further comprising a rough focusing device for almost presuming the focusing position and positioning of said sample in the vicinity of said focusing position.

6. A phase interference microscope according to claim 5, wherein said rough focusing device recognizes a position at which a contrast of intensity in the first light beam reflected from said sample becomes maximum as a rough focusing position.

7. A phase interference microscope according to claim 5, wherein said rough focusing device comprises a shutter for prohibiting the light made incident on said reference mirror.

8. A phase interference microscope according to claim 5, wherein said rough focusing device detects said interference light while swinging said reflection mirror, obtains a light intensity signal from said sample on the basis of said detected value, and recognizes a position at which a contrast of said light intensity signal becomes maximum as a rough focusing position.

* * * * *